United States Patent
Warkentin et al.

(10) Patent No.: US 11,422,840 B2
(45) Date of Patent: Aug. 23, 2022

(54) PARTITIONING A HYPERVISOR INTO VIRTUAL HYPERVISORS

(71) Applicant: VMware, Inc., Palo Alto, CA (US)

(72) Inventors: Andrei Warkentin, Wakefield, MA (US); Harvey Tuch, Cambridge, MA (US); Cyprien Laplace, Cambridge, MA (US); Alexander Fainkichen, Southborough, MA (US)

(73) Assignee: VMWARE, INC., Palo Alto, CA (US)

( * ) Notice: Subject to any disclaimer, the term of this patent is extended or adjusted under 35 U.S.C. 154(b) by 629 days.

(21) Appl. No.: 14/982,837

(22) Filed: Dec. 29, 2015

(65) Prior Publication Data

US 2017/0060613 A1 Mar. 2, 2017

Related U.S. Application Data (60) Provisional application No. 62/211,670, filed on Aug. 28, 2015.

(51) Int. Cl.
*G06F 9/455* (2018.01)

(52) U.S. Cl.
CPC ...... *G06F 9/45558* (2013.01); *G06F 9/45545* (2013.01); *G06F 2009/45562* (2013.01)

(58) Field of Classification Search
CPC ............. G06F 9/45558; G06F 9/45545; G06F 2009/45562
See application file for complete search history.

(56) References Cited

U.S. PATENT DOCUMENTS

| | | | | |
|---|---|---|---|---|
| 8,271,557 | B1* | 9/2012 | Lysaght | G06F 17/30238 707/822 |
| 8,627,451 | B2* | 1/2014 | Walsh | G06F 21/53 713/164 |
| 9,256,467 | B1* | 2/2016 | Singh | G06F 9/5055 |
| 9,569,247 | B2* | 2/2017 | Tsirkin | G06F 9/45558 |
| 2007/0050764 | A1* | 3/2007 | Traut | G06F 9/45558 718/1 |
| 2008/0148277 | A1* | 6/2008 | di Flora | G06F 8/443 719/313 |
| 2011/0061045 | A1* | 3/2011 | Phillips | G06F 9/45541 717/173 |

(Continued)

OTHER PUBLICATIONS

Kleyman, Bill. Understanding Application Containers and OS-Level Virtualization. Available Jan. 5, 2015 at https://www.datacenterknowledge.com/archives/2015/01/05/understanding-application-containers-and-os-level-virtualization (Year: 2015).*

(Continued)

*Primary Examiner* — Michael W Ayers
(74) *Attorney, Agent, or Firm* — Patterson & Sheridan, LLP (57) ABSTRACT

In an example, a computer system includes a hardware platform and a hypervisor executing on the hardware platform. The hypervisor includes a kernel and a plurality of user-space instances within a user-space above the kernel. Each user-space instance is isolated from each other user-space instance through namespaces. Each user-space instance includes resources confined by hierarchical resource groups. The computer system includes a plurality of virtual hypervisors, where each virtual hypervisor executes in a respective user-space instance of the plurality of user-space instances.

20 Claims, 4 Drawing Sheets

(56) References Cited

U.S. PATENT DOCUMENTS

| | | | | |
|---|---|---|---|---|
| 2011/0185063 | A1* | 7/2011 | Head | G06F 9/5077 |
| | | | | 709/226 |
| 2013/0133061 | A1* | 5/2013 | Fainkichen | C09J 7/041 |
| | | | | 726/15 |
| 2013/0263118 | A1* | 10/2013 | Kannan | G06F 9/45558 |
| | | | | 718/1 |
| 2013/0290694 | A1* | 10/2013 | Civilini | H04L 41/0806 |
| | | | | 713/2 |
| 2014/0019968 | A1* | 1/2014 | Deng | G06F 9/45558 |
| | | | | 718/1 |
| 2014/0053272 | A1* | 2/2014 | Lukacs | G06F 21/53 |
| | | | | 726/24 |
| 2014/0229943 | A1* | 8/2014 | Tian | G06F 9/45533 |
| | | | | 718/1 |
| 2015/0370592 | A1* | 12/2015 | Tuch | G06F 9/45558 |
| | | | | 718/1 |
| 2016/0092678 | A1* | 3/2016 | Probert | G06F 9/45558 |
| | | | | 713/193 |

OTHER PUBLICATIONS

Nagy, Gabor. "Operating System Containers vs. Application Containers". https://blog.risingstack.com/operating-system-containers-vs-application-containers/. Available May 19, 2015. Accessed Apr. 22, 2019. (Year: 2015).*

* cited by examiner

PARTITIONING A HYPERVISOR INTO VIRTUAL HYPERVISORS

CROSS-REFERENCE TO RELATED APPLICATIONS

This application claims priority to U.S. provisional patent application Ser. No. 62/211,670, filed Aug. 28, 2015, which is incorporated by reference herein in its entirety.

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Conventional hypervisors are designed to be managed by a single entity. While such hypervisors support multiple users with restricted permissions, they do not support isolated management by multiple independent entities. Users with sufficient privileges can observe host-wide state and all resources are visible to any connected client. While significant effort has focused on ensuring isolation among virtual machines on a physical host, there are few options today for isolating management within the hypervisor on the physical host.

SUMMARY

One or more embodiments provide techniques for partitioning a hypervisor into virtual hypervisors. In an embodiment, a computer system includes a hardware platform and a hypervisor executing on the hardware platform. The hypervisor includes a kernel and a plurality of user-space instances within a user-space above the kernel. Each user-space instance is isolated from each of the other user-space instances through namespaces. Each user-space instance includes resources confined by hierarchical resource groups. The computer system includes a plurality of virtual hypervisors, where each virtual hypervisor executes in a respective user-space instance of the plurality of user-space instances.

A method of creating a tenant in a multi-tenant hypervisor executing on a hardware platform of a host includes creating a user-space instance within a user-space above a kernel of the multi-tenant hypervisor, the user-space instance being isolated from one or more other user-space instances through namespaces, the user-space instance having resources confined by hierarchical resource groups. The method further includes creating a virtual hypervisor within the user-space instance.

Further embodiments include a non-transitory computer-readable storage medium comprising instructions that cause a computer system to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
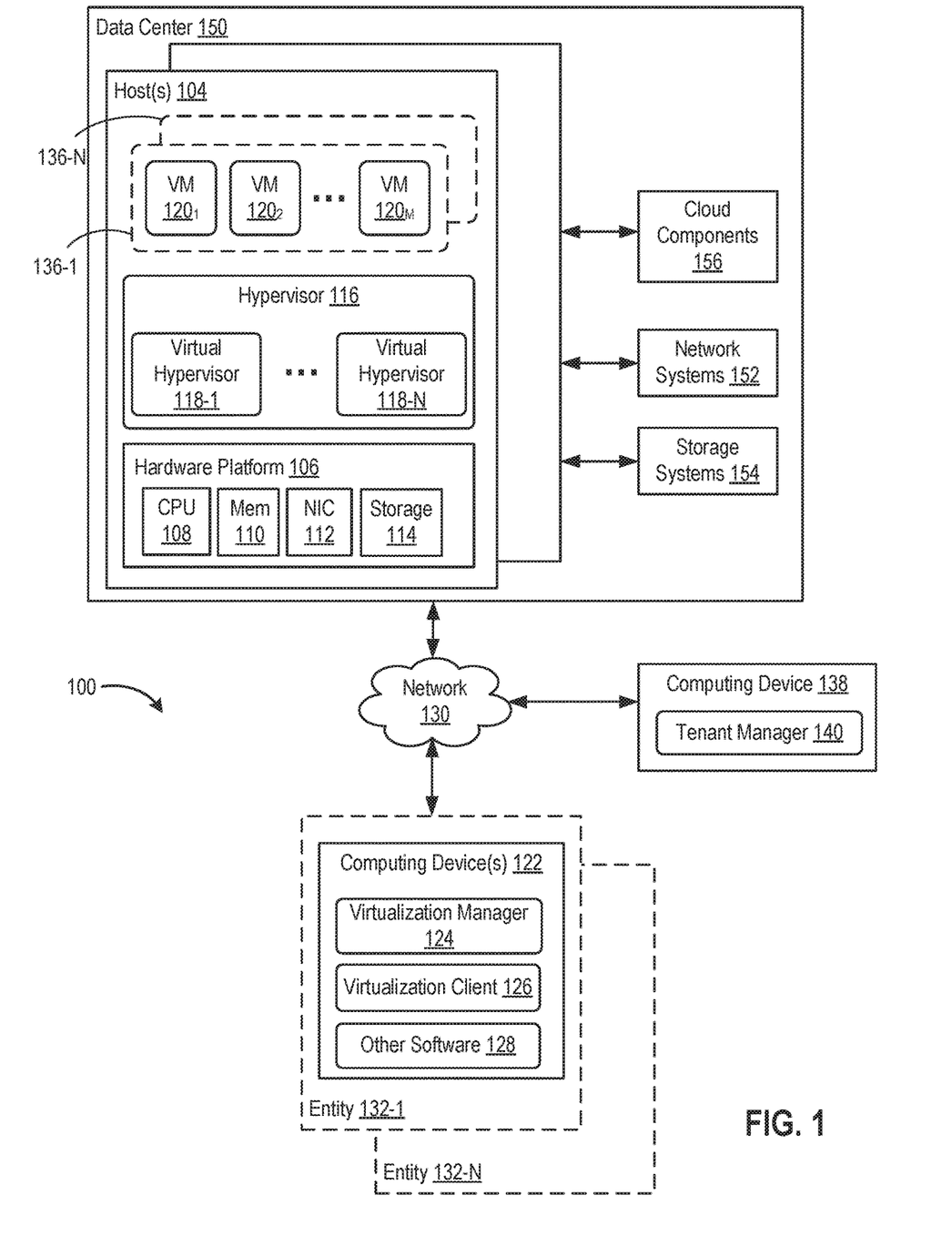
FIG. 1 is a block diagram of a computing system in which one or more embodiments of the present disclosure may be utilized.

FIG. 1 is a block diagram of a computing system 100 in which one or more embodiments of the present disclosure may be utilized. Computing system 100 includes a data center 150 and computing devices 122. Computing devices 122 communicate with data center 150 through a network 130. Computing devices 122 are controlled or managed by different entities, such as entities 132-1 through 132-N (collectively "entities 132"), where N is an integer greater than or equal to one. Computing devices 122 include conventional components, such as one or more processors, system memory, network interfaces, storage systems, and other input/output (I/O) devices such as, for example, a mouse and keyboard (not shown).

In one application, data center 150 is controlled and administrated by a particular enterprise or business organization, and entities 132 are different logical divisions of the enterprise or business organization (e.g., different departments, subsidiaries, etc.). In such an application, data center 150 can be all or part of a "private cloud." In another application, data center 150 is operated by a cloud computing service provider and exposed as a service available to account holders, such as other enterprises and business organizations. In such an application, data center 150 can be all or part of a "public cloud." As used herein, an internal cloud or "private" cloud is a cloud in which entities and the cloud operator are part of the same enterprise or business organization. An external or "public" cloud is a cloud in which entities are separate from the cloud operator and are customers or clients of the cloud operator.

Data center 150 includes one or more host computer systems ("hosts 104"), network systems 152, and storage systems 154. Network systems 152 can include gateways, routers, firewalls, switches, local area networks (LANs), and the like. Storage systems 154 can include storage area networks (SANs), network attached storage (NAS), fibre channel (FC) networks, and the like. Hosts 104 may be constructed on a server grade hardware platform 106, such as an x86 architecture platform. Hosts 104 can be coupled to network systems 152 and storage systems 154. Hosts 104 can be further coupled to network 130 either directly or through network systems 152.

In some examples, data center 150 can also include cloud components 156. Cloud components 156 can include cloud directors, cloud orchestration components, and like type components that are configured to dynamically provide an entity with one or more virtual data centers in which a user may provision VMs, deploy multi-tier applications on VMs, and/or execute workloads. Cloud components 156 can be coupled to hosts 104 for implementing virtual data centers. One example of a cloud director is the VMware vCloud Director® produced by VMware, Inc. Cloud components 156 do not typically expose hosts 104 directly to entities 132 and, as such, entities 132 cannot directly access hypervisor 116 through cloud components 156. Instead, cloud components 156 expose an application programming interface (API) to entities 132 for VM and virtual data center management, such as a REST (Representational State Transfer) API (Application Programming Interface) or any other client-server communication protocol. Some cloud components 156 may make available direct host management, but the smallest supported entity is a host 104. Cloud components 156 do not provide sub-host granularity with direct management interfaces, in contrast with the multi-tenant hypervisor discussed below.

As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions and data to be stored and retrieved. Memory 110 may include, for example, one or more random access memory (RAM) modules. Network interface 112 enables host 104 to communicate with another device via a communication medium, such as network systems 152 and network 130. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems, such as storage systems 154. Examples of a storage interface are a host bus adapter (HBA) that couples host 104 to one or more storage arrays, such as a SAN or a NAS, as well as other network data storage systems.

Each host 104 is configured to provide a virtualization layer that abstracts processor, memory, storage, and networking resources of hardware platform 106 into multiple virtual machines (VMs) 120 that run concurrently on the same hosts. VMs 120 run on top of a software interface layer, referred to herein as a hypervisor 116, which enables sharing of the hardware resources of host 104 by VMs 120. One example of hypervisor 116 that may be configured and used in embodiments described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 116 may run on top of an operating system of host 104 or directly on hardware components of host 104.

Hypervisor 116 includes a file system, referred to herein as the "global file system." In an embodiment, the global file system is backed by storage system 114 (e.g., a local disk). In another embodiment, the global file system is backed by memory 110. For example, a system image for hypervisor 116 may be stored in storage system 114. The system image can include installation files that are used during boot to create the global file system within memory 110. Hypervisor state can be maintained within storage system 114 by updating the system image. Thus, in general, the global file system of hypervisor 116 can be backed by persistent storage, non-persistent storage, or both.

In an embodiment, hypervisor 116 is a multi-tenant hypervisor configured to support independent and isolated management by multiple entities 132. Hypervisor 116 employs operating system (OS)-level virtualization to define a plurality of user-space instances. Each user-space instance is isolated from each other user-space instance through namespaces defined by hypervisor 116, such as process namespaces, network namespaces, storage namespaces, user namespaces, and the like. Further, each user-space instance includes resources allocated by hypervisor 116 using hierarchical resource groups. In this manner, each user-space instance provides an isolated execution environment for a virtual hypervisor. A "virtual hypervisor" is an isolated instance of a hypervisor management plane comprising management daemons, associated processes, and resources confined by the underlying user-space instance. Thus, a virtual hypervisor acts as an isolated virtualized host capable of being managed by an entity in a manner similar to that of a physical host. Hypervisor 116 supports a plurality of virtual hypervisors, e.g., virtual hypervisors 118-1 through 118-N (collectively "virtual hypervisors 118"). Together, a virtual hypervisor and its underlying user-space instance may be referred to herein as a "tenant." Thus, hypervisor 116 supports multiple tenants.

Each virtual hypervisor 118-1 through 118-N is managed by a respective one of entities 132-1 through 132-N through an exposed management API. For example, computing devices 122 can include one or more of a virtualization manager 124, a virtualization client 126, or other management software 128. Virtualization manager 124 is a computer program that resides and executes on a computing device (e.g., a server) either directly or as a virtual machine. One example of a virtualization manager is the VMware vCenter Server™ product made available from VMware, Inc. Virtualization manager 124 is configured to carry out administrative tasks, including managing hosts, managing VMs running within each host, provisioning VMs, migrating VMs from one host to another host, load balancing between hosts, and the like. Virtualization client 126 is a computer program that resides and executes on a computing device (e.g., a workstation) and is configured to manage an individual hypervisor through its API. In general, various other management software 128 can be configured to manage one or more hypervisors through the exposed management API. Each of virtualization manager 124, virtualization client, and other management software 128 can manage one or more of virtual hypervisors 118 transparently as if virtual hypervisors 118 were hypervisors executing on physical hosts.

Operator of data center 150 can manage creation, deletion, etc. of tenants on hypervisor 116 through a tenant manager 140 executing as a computer program within a computing device 138 coupled to network 130. Tenant manager 140 can cooperate with a service executing within hypervisor 116, or an API exposed by hypervisor 116, to create user-space instances, provision virtual hypervisors within such user-space instances, and power-on such virtual hypervisors. Tenant manager 140 can cooperate with hypervisor 116 to power-down virtual hypervisors, remove such virtual hypervisors, and remove associated user-space instances. In some examples, tenant manger 140 can cooperate with hypervisors 116 to perform other operations, such as migrating tenants to another hypervisor executing on another physical host.

By enabling multi-tenancy in hypervisor 116, the granularity of provisioning in data center 150 can be decreased.

This allows the operator of data center 150 to fully utilize and partition large physical hosts for use by multiple distinct entities. Further, sub-host provisioning is not limited to cloud services provided through cloud components 156. Some entities may desire more control over resource management afforded by direct management of a hypervisor as opposed to procuring more opaque cloud services. In such a case, the operator of data center 150 is not limited to provisioning the entire host 104 to an entity and can instead enable multi-tenancy in hypervisor 116. Entities are provided direct access to a hypervisor in the form of a virtual hypervisor 118, and the operator of data center 150 more efficiently employs the resources of host 104.

Figure 2:
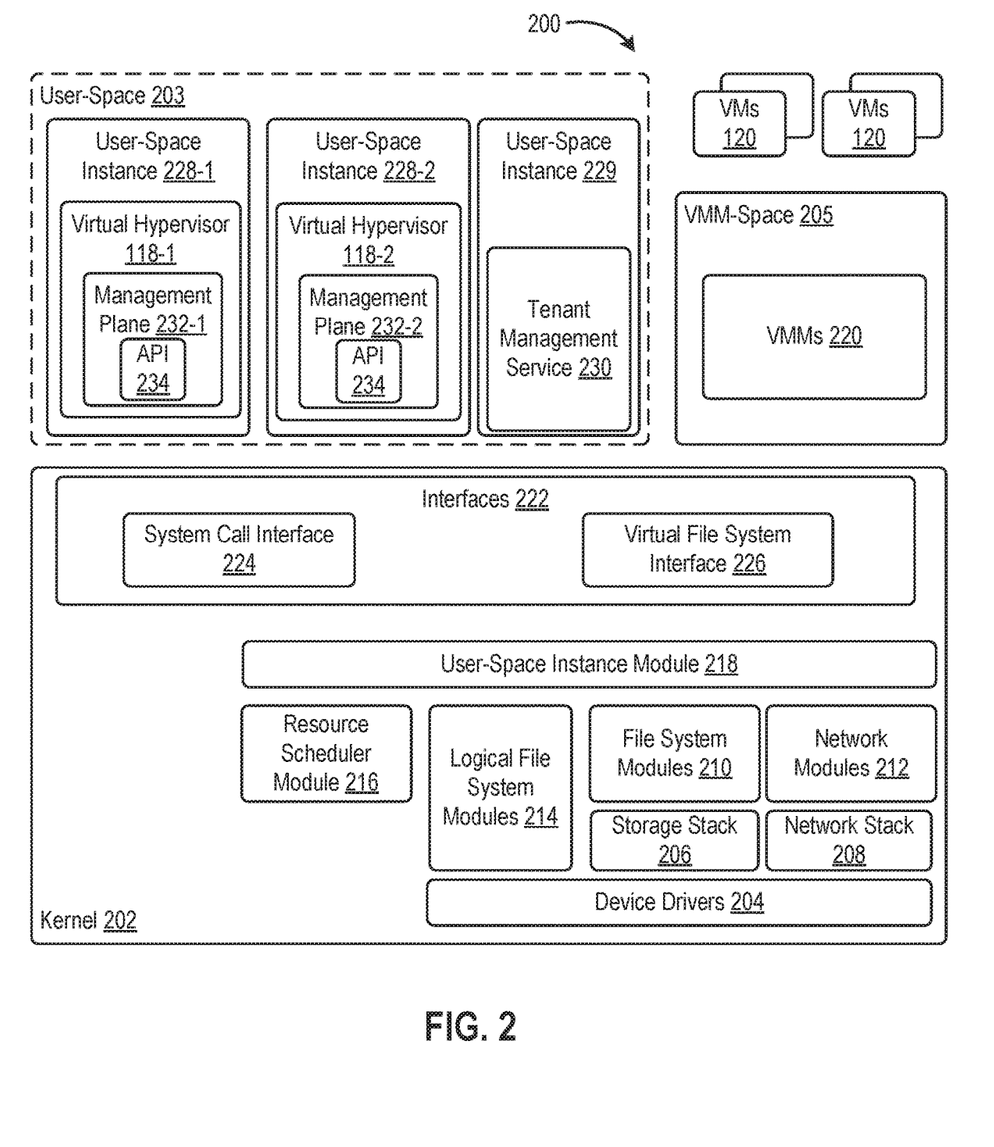
FIG. 2 is a block diagram depicting a software stack implemented by a multi-tenant hypervisor according to an embodiment.

FIG. 2 is a block diagram depicting a software stack 200 implemented by hypervisor 116 according to an embodiment. At the bottom, software stack 200 includes a kernel 202. Logical operating spaces are disposed above kernel 202, such as a user-space 203 and a virtual machine monitor (VMM)-space 205. VMs 120 are disposed above VMM-space 205.

Kernel 202 includes device drivers 204, a storage stack 206, a network stack 208, file system modules 210, network modules 212, logical file system modules 214, a resource scheduler module 216, a user-space instance module 218, and interfaces 222. Interfaces 222 include a system call interface 224 and a virtual file system interface 226. Kernel 202 supports a plurality of logical operating spaces, including user-space 203 and VMM-space 220. VMM-space 205 includes one or more VMMs 220 executing therein. User-space 203 includes a plurality of user-space instances, e.g., user-space instances 228-1, 228-2, and 229. User-space instance 229 includes a tenant management service 230 executing therein.

Kernel 202 can be a portable operating system interface (POSIX)-style OS designed to operate as a hypervisor that supports execution of virtual machines. Device drivers 204 include a collection of modules configured to manage the hardware of the physical host on which hypervisor 116 is installed (e.g., host 104). Storage stack 206 includes a collection of modules providing various layers that create and map logical storage to physical storage managed by device drivers 204. For example, device drivers 204 can manage physical storage interfaces, such as FC, FC over Ethernet (FCoE), Internet Small Computer System Interface (iSCSI), SCSI, Integrated Drive Electronics (IDE), Serial AT Attachment (SATA), Serial Attached SCSI (SAS), and like interfaces. Storage stack 206 provides higher-level logical interfaces to such physical storage, such as a block-level interfaces, logical volume interfaces, SCSI subsystems, and the like. File system modules 210 impose file system structures on the logical devices provided by storage stack 206, such as file allocation table (FAT), New Technology File System (NTFS), extended file systems (e.g., ext2, ext3, ext4), Virtual Machine File System (VMFS), network file system (NFS), and the like.

Network stack 208 includes a collection of modules that implement various layers to provide a logical interface to physical network devices managed by device drivers 204. For example, device drivers 204 can manage physical NICs, while network stack 208 can include a link layer (e.g., Ethernet), a network layer (e.g., Internet Protocol (IP)), a transport layer (e.g., Transmission Control Protocol (TCP)), application session layer (e.g., Secure Socket Layer (SSL)), and the like. Network modules 212 provide various logical network devices supported by network stack 208, such as virtual switches, virtual NICs, and the like. In particular, network modules 212 can define one or more virtual switches. Each virtual switch can have one or more uplink ports associated with one or more physical NICs. Network modules 212 can define one or more virtual switches to be coupled to ports of each virtual switch. Virtual NICs can be provisioned to virtual machines. In this manner, network modules 212 allow a plurality of virtual machines to share the physical NIC(s).

Kernel 202 includes various logical file system modules 214, such as a device file system module (e.g., devfs), a process file system module (e.g., procfs), a volume cache file system module (e.g., vcfs) and the like. Kernel 202 includes a resource scheduler module 216 configured to allocate resources among different executing processes, such as CPU resources, memory resources, storage resources, network resources, and the like. System call interface 224 includes a plurality of system calls that processes use to interface with kernel 202. System call interface 224 can include standard POSIX system calls, as well as specialized system calls that extend the core set of POSIX system calls (e.g., system calls added by kernel modules or proprietary to the kernel itself). Virtual file system interface 226 includes a versioned and typed hierarchical namespace that provides an interface to kernel 202. Virtual file system interface 226 can be used to communicate hardware and kernel state and for manipulating kernel modules.

VMM-space 205 provides an execution environment and appropriate privileges for the execution of VMMs 220. VMMs 220 in turn provide execution environments for guest operating systems of VMs 120. VMMs 220 expose virtualized hardware to the guest operating systems, such as a virtual BIOS, virtual CPUs, virtual RAM, virtual disks, virtual NICs, and the like. The guest operating systems execute on the virtual hardware.

Each user-space instance provides an execution environment and appropriate privileges for the execution of processes. That is, the management plane of hypervisor 116 is implemented within user-space 203. A hypervisor management plane includes management daemons and associated processes that provide an API for managing the hypervisor (e.g., setting network parameters, setting storage parameters, setting users, passwords, and permissions, creating, deleting, or otherwise managing virtual machines, managing resource pools, managing features such as migration, disaster recovery, and high-availability). If hypervisor 116 is configured as a single-tenant hypervisor, then the management plane executes directly within a single user-space instance (e.g., the user-space instance 229). When hypervisor 116 is configured as multi-tenant hypervisor, then multiple isolated management plane instances execute within multiple user-space instances (e.g., user-space instances 228-1 and 228-2, as well as user-space instance 229).

Tenant management service 230 is configured to implement multi-tenancy within hypervisor 116. Tenant management service 230 can be a process executing within user-space instance 229. An administrator can interact with tenant management service 230 (e.g., using tenant manager 140) to create, delete, and otherwise manage tenants. In particular, tenant management service 230 can interact with user-space instance module 218 through interfaces 222 to create user-space instances 228. Each user-space instance 228 provides an isolated execution environment for a virtual hypervisor 118. User-space instances 228 achieve isolation through provisioning of namespaces and hierarchical resource groups. Each virtual hypervisor 118 includes a management plane instance, e.g., virtual hypervisor 118-1 includes management plane 232-1 and virtual hypervisor 118-2 includes management plane 232-2. Management plane 232 of each virtual hypervisor 118 includes management daemons, associated processes, and resources confined by a respective user-space instance 228. Each management plane instance exposes an API 234. Users can interact with API 234 to manage a virtual hypervisor 118, as well as create, delete, or otherwise manage virtual machines supported by VMMs 220 in VMM-space 205. VMMs 220 provide isolation among virtual machines, while user-space instances 228 provide isolation among hypervisor management planes. To the users, each virtual hypervisor 118 acts as a hypervisor executing on an isolated host.

User-space instance module 218 is configured to interact with other kernel modules to support host-level multi-tenancy through creation and management of tenants (e.g., user-space instances 228 and virtual hypervisors 118). User-space instance module 218 can add system calls to system call interface 224 and/or nodes to virtual file system interface 226 to allow process(es) to create tenants (e.g., tenant management service 230). While user-space instance module 218 is described as a single module, it is to be understood that some portions of the program code necessary to create and manage tenants can be distributed throughout other kernel modules (e.g., storage stack 206, network stack 208, logical file system modules 214, etc.). Thus, references to user-space instance module 218 herein also encompass such distributed code in other kernel modules.

In an embodiment, user-space instance module 218 is configured to sanitize interfaces 222 to prevent user-space instances 228 from accessing and manipulating host state. For example, user-space instance module 218 can hide or provide stubs for certain nodes of virtual file system interface 226. A hidden node is not accessible (readable or writeable) by user-space instances 228. A stubbed node may be accessible, but user-space instance module 218 intercepts any access (read or write) by user-space instances 228 and performs custom processing. For example, certain node-trees in virtual file system interface 226 related to the hardware of host 104 can be hidden from user-space instances 228 so that user-space instances cannot access or manipulate host-hardware state. Other node-trees in virtual file system interface 228 related to resource groups can be stubbed to show only a subset of information to each user-space instance 228. This prevents a user-space instance 228 from observing or manipulating resource groups assigned to other user-space instances 228. In an embodiment, user-space instance module 218 implements an opt-in approach for node visibility. In such an approach, nodes are hidden from user-space instances 228 unless specifically opting-in. Virtual file system interface 226 can include flags or other information that indicates whether a given node-tree opts in to be visible to user-space instances 228.

Likewise, user-space instance module 218 can hide or provide stubs for certain system calls of system call interface 224. For example, system calls that provide for module loading, CPU microcode updates, and device scanning can be hidden or stubbed. In another example, system calls that manipulate kernel 202 or query hardware state can be hidden from user-space instances 228. In an embodiment, user-space instance module 218 implements an opt-in approach for presenting system calls to user-space instances 228. In such an approach, system calls are not presented to user-space instance 228 unless specifically opting-in. System call interface 224 can include flags or other information that indicates whether a given system call opts in to be visible to user-space instances 228.

As described below, user-space instances 228 include separate storage namespaces. User-space instance module 218 cooperates with file system modules 210 to implement mount points and/or reparse points in the global file system of hypervisor 116. Mount points allow a file system (whether logical or backed by a physical storage device) to be attached to a particular sub-tree of the global file system. Reparse points allow for a sub-tree of the global file system to be aliased at an arbitrary location. For example, user-space instance module 218 can cooperate with logical file system modules 214 to provide reparse points for instances of the logical file systems (e.g., devfs, procfs, vcfs, etc.). Each of the logical file system modules can be configured to support multiple user-space instances. For example, the volume cache file system (vcfs) provides access to storage volumes accessible by hypervisor 116. The vcfs module can maintain per-user-space instance data structure(s) identifying storage volumes associated with particular tenants. In another example, the device file system (devfs) provides access to various block, character, and special devices recognized by kernel 202. The devfs module can be configured to filter-out various devices from being accessible by tenants for purposes of isolating the tenants from direct access to host devices.

As described below, user-space instances 228 include separate network namespaces. User-space instance module 218 cooperates with network stack 208 to implement separate network stacks for user-space instances 228. User-space instance module 218 also cooperates with network modules 212 to create simulated physical NICs for user-space instances 228. Each simulated physical NIC is coupled to a port of a virtual switch managed by hypervisor 116, which is in turn coupled to a physical NIC. A virtual hypervisor 118 executing in a user-space instance 228 can create its own vSwitch having its uplink port coupled to an simulated physical NIC assigned to the underlying user-space instance 228.

Figure 3:
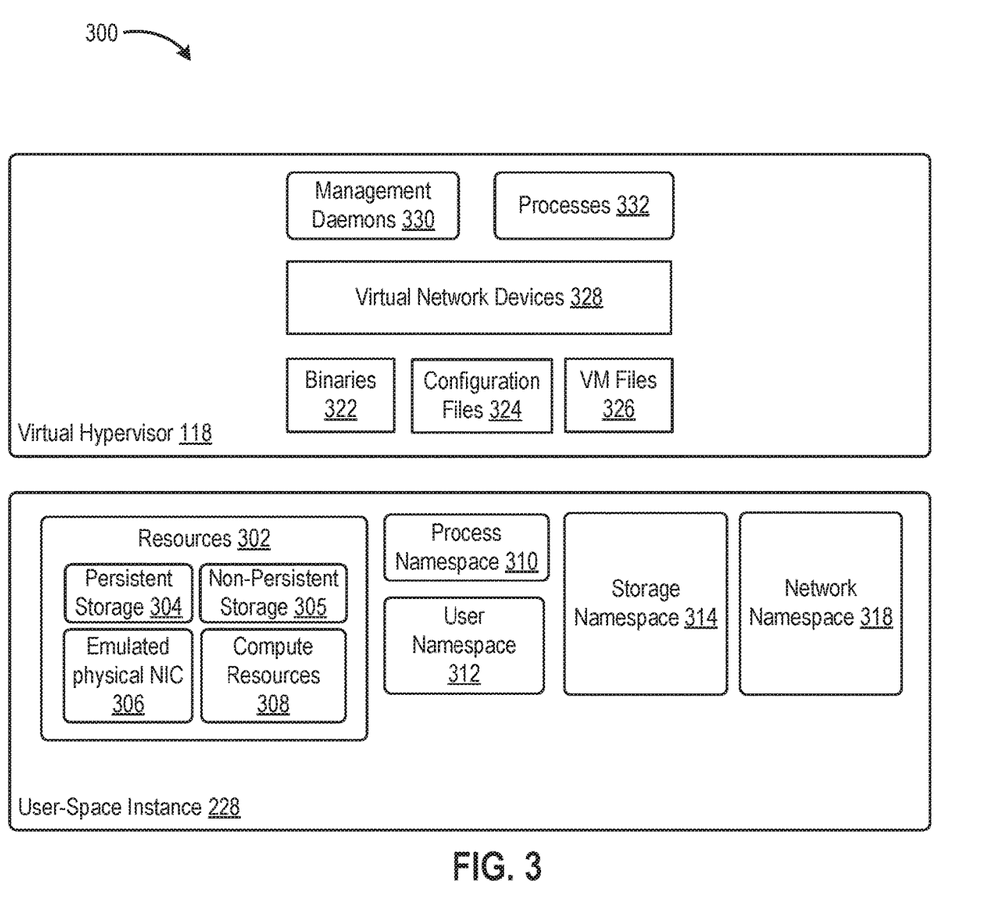
FIG. 3 is a block diagram showing a tenant within a multi-tenant hypervisor according to an embodiment.

FIG. 3 is a block diagram showing a tenant 300 within a multi-tenant hypervisor according to an embodiment. As shown in FIG. 3, user-space instance 228 includes resources 302, a process namespace 310, a user namespace 312, a storage namespace 314, and a network namespace 318. Resources 302 include a share of resources allocated to user-space instance 228 by resource scheduler module 216 and user-space instance module 218 in kernel 202. Example resources include persistent storage 304, non-persistent storage 305, simulated physical NIC(s) 306, and compute resources 308 (e.g., CPU and memory allocations). Process namespace 310 provides a separate process tree for user-space instance 228. All processes executing within user-space instance 228 are confined to process namespace 310. User namespace 312 can provide separate users, passwords, permissions, etc. for user-space instance 228. Network namespace 318 can include a separate network stack for user-space instance 228.

Storage namespace 314 provides a separate root file system for user-space instance 228. All processes are confined to use the separate root file system (e.g., a chroot environment). In an embodiment, storage namespace 314 is placed in the global file system hierarchy of hypervisor 116. For example, the global file system of hypervisor 116 can include a directory "/tenants" that will hold storage namespaces of tenants. Storage namespace 314 for user-space instance 228 can be placed in the global file system hierarchy at "/tenants/name," where name is an identifier associated with user-space instance 228. Storage namespace 314 can be rooted at "/tenants/name" (e.g., /tenants/name can be mounted as/(root file system) for user-space instance 228). As such, user-space instance 228 will have no visibility outside of the /tenants/name sub-tree in the global file system of hypervisor 116.

Storage namespace 314 can be backed by persistent storage 304, non-persistent storage 305, or both. For example, the /tenants/name sub-tree can be backed by non-persistent storage 305 (e.g., a RAM-based file system backed by RAM). Re-parse points can be created in the /tenants/name sub-tree for various logical file systems, such as devfs and procfs.

Tenant state, such as log files, configuration files, VMs, and the like, can be stored on a particular storage volume that is part of persistent storage 304 (e.g., either local storage or remote storage). For example, a tenant having name can be associated with a storage volume labeled name-state. The storage volume name-state would be mounted by the vfcs module in the global file system of hypervisor, e.g., at /vmfs/volumes/name-state. Storage namespace 314 has no visibility into the /vmfs sub-tree of the global file system, but a re-parse point can be created at /tenants/name/persistent that is backed by /vmfs/volumes/name-state in the global file system.

User-space instance 228 can store persistent data at /persistent within storage namespace 314. Parts of file system for user-space instance 228 that need to be persistently stored can be symbolically linked (symlinked) into the /persistent directory. For example, the /etc and /var directories within storage namespace 314 can be symlinked into /persistent/etc and /persistent/var. The storage volume labeled name-state can also store a datastore having VM files for the tenant. For example, the datastore can be accessible at /persistent/datastore1 within storage namespace 314. Some management processes may expect the datastore to be mounted at a particular location within storage namespace 314, such as in /vmfs/volumes. As such, a re-parse point can be created at /vmfs/volumes/datastore1 within storage namespace 314 backed by /persistent/datastore1. The above-described construction of storage namespace 314 is merely one example and various other file system structures can be used having the same or different mount points and/or re-parse points.

Virtual hypervisor 118 includes binaries 322, configuration files 324, VM files 326, virtual network devices 328, management daemons 330, and processes 332. Binaries 322, configuration files 324, and VM files 326 are stored within storage namespace 314 (e.g., binaries 322 in /bin, configuration files 324 in /etc, and VM files 326 in /persistent/datastore1). Virtual network devices 328 include virtual NICs, virtual switches, and the like. Each virtual switch of virtual hypervisor 118 includes uplink port(s) coupled to simulated physical NIC(s) 306. Virtual NICs can be provisioned among the VMs. Management daemons 330 include various management processes that provide the API for virtual hypervisor 118. Processes 332 include various other processes, such as virtual machine helper processes, logging processes, and the like. Management daemons 330 and processes 332 execute within process namespace 310.

Figure 4:
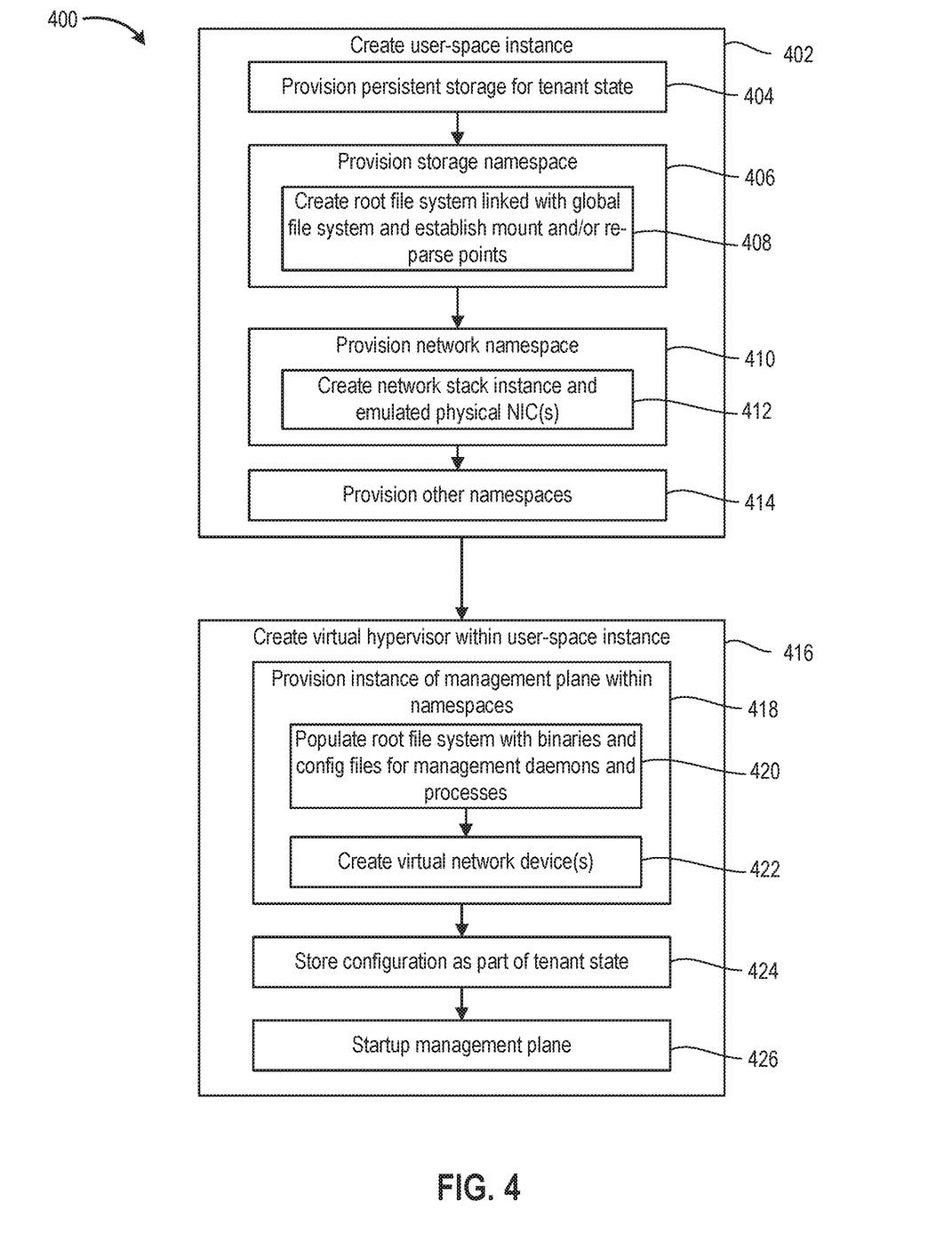
FIG. 4 is a flow diagram depicting a method of creating a tenant in a multi-tenant hypervisor according to an embodiment.

FIG. 4 is a flow diagram depicting a method 400 of creating a tenant in a multi-tenant hypervisor according to an embodiment. Method 400 can be performed by tenant management service 230 in cooperate with user-space instance module 218 in kernel 202. An administrator can initiate and control execution of method 400 by tenant management service 230 using tenant manager 140.

Method 400 begins at step 402, where tenant management service 230 creates a user-space instance for the tenant. In an embodiment, tenant management service 230 provisions persistent storage for hold tenant state (404), provision a storage namespace (406), provision a network namespace (410), and provision any additional namespaces (414). At step 404, tenant management service 230 provisions persistent storage for storing tenant state on a storage volume, which can be stored in storage 114 or in storage systems 154. In an embodiment, the storage volume is implemented as a VMFS file system on a virtual disk. Implementing the storage volume as a virtual disk allows for control and management of persistent storage provisioned for each tenant (e.g., a tenant cannot consume more space than allocated to the virtual disk). Alternative implementations are possible, including other types of file systems on a virtual disk, as well as VMFS or other types of file systems directly on storage 114 or storage systems 154.

At step 406, tenant management service 230 provides the storage namespace. In an embodiment, tenant management service 230 creates a root file system linked with the global file system of hypervisor 116 (e.g., /tenants/name sub-tree), and establishes various mount points, re-parse points, and/or symlinks (408). For example, the root file system can include a re-parse point for accessing the storage volume provisioned at step 404 (e.g., a re-parse point at /tenants/name/persistent backed by /vmfs/volumes/name-state). The root file system can include re-parse points for accessing logical file systems (e.g., devfs, procfs, etc.). The root file system can include symlinks to directories on the storage volume for directories requiring persistent storage (e.g., /var, /etc/, and the like).

At step 410, tenant management service 230 provisions the network namespace. In an embodiment, tenant management service 230 creates a network stack instance and simulated physical NIC(s) (412). At step 414, tenant management service 230 provisions one or more other namespaces, such as a process namespace, user namespace, and the like.

At step 416, tenant management service 230 creates a virtual hypervisor within the user-space instance. In an embodiment, tenant management service 230 provisions an instance of a management plane within the namespaces (418), store configuration as part of the tenant state (424), and startup the management plane (426).

At step 418, tenant management service 230 provisions the instance of the management plane within the namespaces defined for the user-space instance. In an embodiment, tenant management service 230 populates the root file system with binaries, scripts, configuration files, and other files for the management daemons and associated processes of the management plane (420). In an embodiment, tenant management service 230 copies files from the global file system of hypervisor 116. In another embodiment, tenant management service 230 copies files from installable packages in a system image. This allows the virtual hypervisor to be a different version than hypervisor 116 (e.g., storage 114 can store multiple system images for different hypervisor versions). In an embodiment, tenant management service 230 creates various virtual network device(s), such as virtual switch(es) and virtual NIC(s) (422).

At step 424, tenant management service 424 stores a configuration of virtual hypervisor (state information) as part of the tenant state in storage volume provisioned at step 404. At step 426, tenant management service 424 starts up the management plane. Thereafter, a user can interact with the management plane of the virtual hypervisor to manipulate the virtual hypervisor, create or otherwise manage virtual machines, and the like.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer or within a user-space instance. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors or virtual hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user-space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers. Such virtualized computing instances can be created and managed by a single-tenant hypervisor or a virtual hypervisor in a multi-tenant hypervisor.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A computer system, comprising:
a hardware platform;
a hypervisor executing on the hardware platform, the hypervisor managing one or more virtual machines external to the hypervisor, the hypervisor including a kernel and a plurality of user-space instances defined by the kernel using operating system (OS)-level virtualization, each user-space instance being isolated from each other user-space instance through namespaces, each user-space instance having resources confined by hierarchical resource groups; and a plurality of virtual hypervisors, each virtual hypervisor executing in a respective user-space instance of the plurality of user-space instances, each virtual hypervisor including an instance of a management plane of the hypervisor.

2. The computer system of claim 1, further comprising:
one or more virtualized computing instances executing within each of the plurality of virtual hypervisors.

3. The computer system of claim 1, wherein each user-space instance is isolated from each other user-space instance through process namespaces of the namespaces, each user-space instance including processes executing within a respective process namespace.

4. The computer system of claim 1, wherein the kernel includes a virtual file system interface providing hardware state of the hardware platform and kernel state of the kernel, the kernel configured to hide or stub one or more nodes of the virtual file system interface for processes executing in each user-space instance.

5. The computer system of claim 1, wherein the kernel includes a system call interface, the kernel configured to hide or stub one or more system calls of the system call interface for processes executing in each user-space instance.

6. The computer system of claim 1, wherein each virtual hypervisor comprises a management plane providing an application programming interface (API).

7. The computer system of claim 1, wherein each user-space instance is isolated from each other user-space instance through storage namespaces of the namespaces, each user-space instance including a respective storage namespace backed by at least one of persistent storage or non-persistent storage.

8. The computer system of claim 7, wherein the persistent storage backing the respective storage namespace for each user-space instance comprises a storage volume configured to store state information, of the respective user-space instance, comprising at least one of: virtual computing instance files; log files; or configuration files.

9. The computer system of claim 7, wherein the storage namespace for each user-space instance includes at least one of: at least one mount point or at least one re-parse point, in a file system of the hypervisor.

10. The computer system of claim 1, wherein each user-space instance is isolated from each other user-space instance through network namespaces of the namespaces, each user-space instance including an instance of a network stack in a respective network namespace.

11. A method of creating a tenant in a multi-tenant hypervisor executing on a hardware platform of a host, the method comprising:
creating a user-space instance included in the multi-tenant hypervisor and defined by a kernel of the multi-tenant hypervisor using operating system (OS)-level virtualization, the user-space instance being isolated from one or more other user-space instances through namespaces, the user-space instance having resources confined by hierarchical resource groups, the multi-tenant hypervisor managing one or more virtual machines external to the multi-tenant hypervisor,; and
creating a virtual hypervisor within the user-space instance, the virtual hypervisor including an instance of a management plane of the multi-tenant hypervisor.

12. The method of claim 11, wherein the step of creating the user-space instance comprises:
provisioning persistent storage for storing tenant state;
provisioning a storage namespace of the namespaces; and
provisioning a network namespace of the namespaces.

13. The method of claim 12, wherein the step of provisioning the storage namespace comprises:
creating a root file system linked with a global file system of the multi-tenant hypervisor for the user-space instance; and
creating one or mount points, one or more re-parse points, or one or more symbolic links in the root file system.

14. The method of claim 12, wherein the step of provisioning the network namespace comprises:
creating a network stack instance for the user-space instance; and
creating a simulated physical network interface card (NIC) for the user-space instance.

15. The method of claim 11, wherein the step of creating the virtual hypervisor comprises:
provisioning an instance of a management plane in the namespaces of the user-space instance.

16. The method of claim 15, wherein the step of provisioning the instance of the management plane comprises:
populating a root file system for the user-space instance with files for management daemons and processes; and
creating one or more virtual network devices.

17. The method of claim 15, wherein the step of creating the virtual hypervisor further comprises:
storing a configuration of the virtual hypervisor as part of tenant state in persistent storage allocated for use by the user-space instance.

18. The method of claim 15, wherein the step of creating the virtual hypervisor further comprises:
starting up the management plane for access by a user.

19. A non-transitory computer readable medium having instructions stored thereon that when executed by a processor cause the processor to perform a method of creating a tenant in a multi-tenant hypervisor executing on a hardware platform of a host, the method comprising:
creating a user-space instance included in the multi-tenant hypervisor and defined by a kernel of the multi-tenant hypervisor using operating system (OS)-level virtualization, the user-space instance being isolated from one or more other user-space instances through namespaces, the user-space instance having resources confined by hierarchical resource groups, the multi-tenant hypervisor managing one or more virtual machines external to the multi-tenant hypervisor,; and
creating a virtual hypervisor within the user-space instance, the virtual hypervisor including an instance of a management plane of the multi-tenant hypervisor.

20. The non-transitory computer readable medium of claim 19, wherein the step of creating the user-space instance comprises:
provisioning persistent storage for storing tenant state;
provisioning a storage namespace of the namespaces; and
provisioning a network namespace of the namespaces.

* * * * *